(12) United States Patent        (10) Patent No.:     US 9,339,130 B1
Johnson et al.                   (45) Date of Patent:     May 17, 2016

(54) DISPLAY FIXTURE WITH SWATCH HOLDER

(71) Applicant: Target Brands, Inc., Minneapolis, MN (US)

(72) Inventors: Jason W. Johnson, Wayzata, MN (US); Erin L. Zobel, Minneapolis, MN (US)

(73) Assignee: Target Brands, Inc., Minneapolis, MI (US)

( * ) Notice: Subject to any disclaimer, the term of this patent is extended or adjusted under 35 U.S.C. 154(b) by 0 days.

(21) Appl. No.: 14/609,582

(22) Filed: Jan. 30, 2015

(51) Int. Cl.
*A47F 7/02* (2006.01)
*A47F 5/00* (2006.01)
*F16B 45/02* (2006.01)

(52) U.S. Cl.
CPC ............... *A47F 7/022* (2013.01); *A47F 5/0006* (2013.01); *F16B 45/02* (2013.01)

(58) Field of Classification Search
CPC ... A47F 5/0006; A47F 5/0823; A47F 5/0861; A47F 5/0869; A47F 1/128; A47F 7/022; Y10T 29/49959; G09F 3/20; G09F 3/204; F16B 45/02
USPC ........ 211/85.2, 85.3, 4, 6, 7, 57.1, 59.1, 54.1; 248/221.12, 221.1, 224.8, 304; 40/642.01, 649
See application file for complete search history.

(56) References Cited

U.S. PATENT DOCUMENTS

| | | | |
|---|---|---|---|
| 914,469 A | 3/1909 | Weaver | |
| 962,855 A | 6/1910 | Perkins | |
| 1,856,239 A * | 5/1932 | Buckley | A47F 7/024 211/4 |
| D249,460 S | 9/1978 | Bleed | |
| D249,461 S | 9/1978 | Swinehart et al. | |
| 4,246,710 A * | 1/1981 | Mixer | A47F 5/0869 211/57.1 |
| 4,286,764 A * | 9/1981 | Pfeifer | A47F 5/0869 248/220.22 |
| 5,236,163 A * | 8/1993 | Valiulis | A47F 5/0869 211/57.1 |
| 5,289,652 A * | 3/1994 | Kringel | G09F 3/204 40/651 |
| 5,441,161 A * | 8/1995 | Merl | A47F 5/0869 211/57.1 |
| 5,499,722 A * | 3/1996 | Goldring | A47F 5/0869 211/106 |
| 5,979,674 A * | 11/1999 | Thalenfeld | A47F 5/0869 211/57.1 |
| 6,119,990 A * | 9/2000 | Kump | A47F 5/0068 211/57.1 |
| 6,389,722 B1 * | 5/2002 | Josefsson | A47F 5/0869 211/57.1 |
| 6,474,478 B1 | 11/2002 | Huehner et al. | |
| 6,659,291 B2 | 12/2003 | Huehner et al. | |
| D494,046 S * | 8/2004 | DeBiasio, Jr. | D8/370 |
| 6,957,555 B1 | 10/2005 | Nagel et al. | |
| D521,363 S | 5/2006 | Copen et al. | |
| 7,131,542 B2 | 11/2006 | Sedon et al. | |
| 7,392,673 B2 | 7/2008 | Fawcett et al. | |
| 7,513,074 B2 | 4/2009 | Glenn et al. | |
| 7,530,188 B2 | 5/2009 | Beilenhoff et al. | |
| 7,703,308 B2 | 4/2010 | Nagelski | |

(Continued)

*Primary Examiner* — Joshua J Michener
*Assistant Examiner* — Theodore Adamos
(74) *Attorney, Agent, or Firm* — Leanne Taveggia Farrell; Westman, Champlin & Koehler, P.A.

(57) ABSTRACT

A swatch holder includes a display hook, a swivel plate and a stop pin. The display hook includes an upper stem and a lower stem. The swivel plate includes a bored extension that protrudes from a back of the swivel plate and is mounted on a free end of the upper stem. The stop pin includes an insertion end inserted through a slot in the bored extension and through an aperture in the distal end of the upper stem and an exterior end that extends into the slot. The swivel plate is rotatable about the upper stem so that when the swivel plate is in a first position the exterior end of the stop pin is located adjacent a first end of the slot and when the swivel plate is in a second position the exterior end of the stop pin is located adjacent a second end of the slot.

18 Claims, 8 Drawing Sheets

(56) References Cited

U.S. PATENT DOCUMENTS

| | | | |
|---|---|---|---|
| 7,743,931 B2* | 6/2010 | Barkdoll | A47F 5/0861 211/7 |
| 7,882,964 B2* | 2/2011 | Battaglia | A47F 5/0823 211/183 |
| 8,132,347 B2* | 3/2012 | Oliver-Collins | G09F 3/20 211/57.1 |
| 8,286,454 B2 | 10/2012 | Richardson et al. | |
| 8,307,995 B2 | 11/2012 | Surma et al. | |
| 8,376,150 B2 | 2/2013 | Surma et al. | |
| 8,534,469 B2 | 9/2013 | Northrup, Jr. et al. | |
| 8,794,453 B2 | 8/2014 | Kologe | |
| 2009/0057244 A1* | 3/2009 | Conti | A47F 5/0861 211/7 |
| 2014/0032447 A1* | 1/2014 | Fisher | A47F 7/0021 705/500 |
| 2014/0083959 A1* | 3/2014 | Kalafut | A47F 5/0861 211/13.1 |
| 2014/0374556 A1 | 12/2014 | Zobel et al. | |

\* cited by examiner

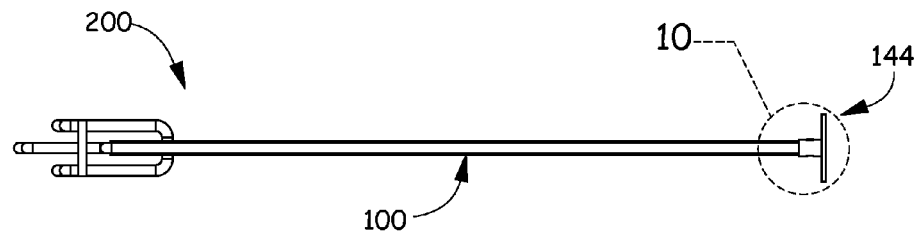
Fig. 9
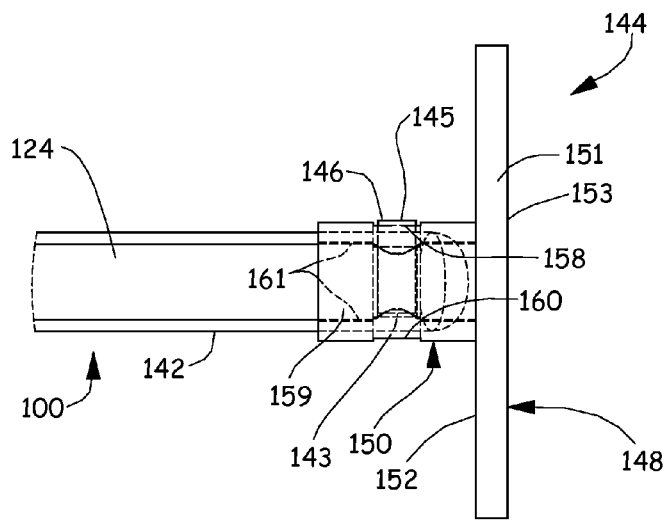
Fig. 10
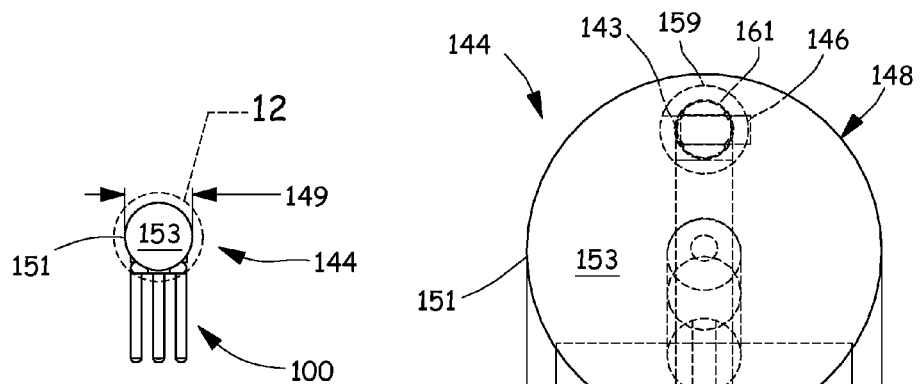
Fig. 11
Fig. 12

DISPLAY FIXTURE WITH SWATCH HOLDER

BACKGROUND

Businesses, such as retail stores, use a variety of types of display structures to present products or samples of products to customers for purchase. An example type of display structure is a display hook used to support hanging products or samples of products that are being offered for sale. Exemplary display hooks include hooks for mounting to cross bars or cross wire supports, hooks for mounting to peg boards and hooks for mounting to slatted walls.

The discussion above is merely provided for general background information and is not intended to be used as an aid in determining the scope of the claimed subject matter.

SUMMARY

A swatch holder includes a display hook, a swivel plate and a stop pin. The display hook includes an upper stem having a free end and a lower stem having a free end. The swivel plate includes a bored extension that protrudes from a back of the swivel plate and is mounted on the free end of the upper stem. The stop pin includes an insertion end and an exterior end. The insertion end is inserted through a slot in the bored extension and through an aperture in the distal end of the upper stem. The exterior end extends into the slot in the bored The swivel plate is rotatable about the upper stem so that when the swivel plate is in a first position the exterior end of the stop pin is located adjacent a first end of the slot in the bored extension and when the swivel plate is in a second position the exterior end of the stop pin is located adjacent a second end of the slot in the bored extension.

A swatch holder includes a display hanger having a first arm that extends at least partially along an axis and has a distal end and a proximal end and a second arm that has a distal end and a proximal end. At least a portion of the second arm is located below at least a portion of the first arm. A front plate assembly is coupled to the distal end of the first arm and includes a stop pin, a swivel plate and a stem receiver attached to a back of the swivel plate. The stem receiver extends from a back of the swivel plate and terminates at an end and has an interior bearing surface and a peripheral slot. The distal end of the first arm is inserted into the stem receiver. The stop pin is inserted through the peripheral slot in the stem receiver and through a hole in the distal end of the first arm that extends through the first arm in a direction that is transverse to the axis of the first arm. The front plate assembly is located in a resting position when a portion of the back of the swivel plate is located adjacent to the distal end of the second arm and the front plate assembly is located in a load/unload position when the swivel plate is rotated about the distal end of the first arm using the interior bearing surface of the stem receiver such that an item that is loaded or unloaded from the second arm.

A method of loading an item on a swatch holder is included. A swivel plate that is mounted to a distal end of an upper rod with a bored extension that protrudes from a back of the swivel plate is rotated so that the swivel plate rotates from a resting position where the back is located adjacent to a distal end of a lower rod to a load/unload position where the back is rotated away from the distal end of the lower rod. An item is loaded onto the lower rod. The swivel plate is released so that the swivel plate returns to the resting position where the back of the swivel plate is adjacent to the distal end of the lower rod so that the item cannot be easily taken off the lower rod.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 9 is an assembled top view of FIG. 6.

FIG. 10 is an enlarged view of a portion of FIG. 9.

FIG. 11 is an assembled front view of FIG. 6.

FIG. 12 is an enlarged view of a portion of FIG. 11.

DETAILED DESCRIPTION

Swatch holders described in the below embodiments are mounted to a cross support or cross bar, which is attached to a display fixture for display in a business, such as a retail store. Each swatch holder includes a display hook for displaying a swatch and a front plate assembly for securing the swatch to the display hook. The plate assembly includes a swivel plate that rotates in a counterclockwise direction so the display hook can be loaded with a swatch and rotates clockwise back to a resting position after the swatch is loaded to secure the swatch on the display hook. The display hooks are multi-configurable in that they can be oriented at different angles relative to the cross support to which they are mounted.

Figure 1:
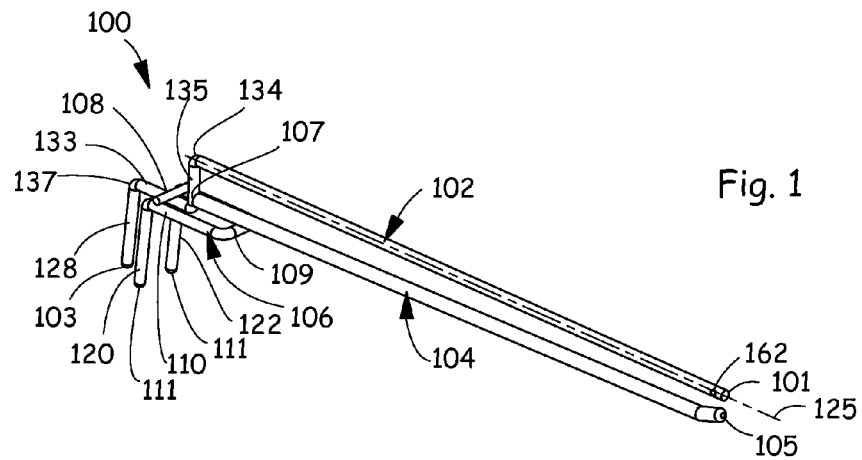
FIG. 1 is a perspective view of a display hook according to one embodiment.
Figure 2:
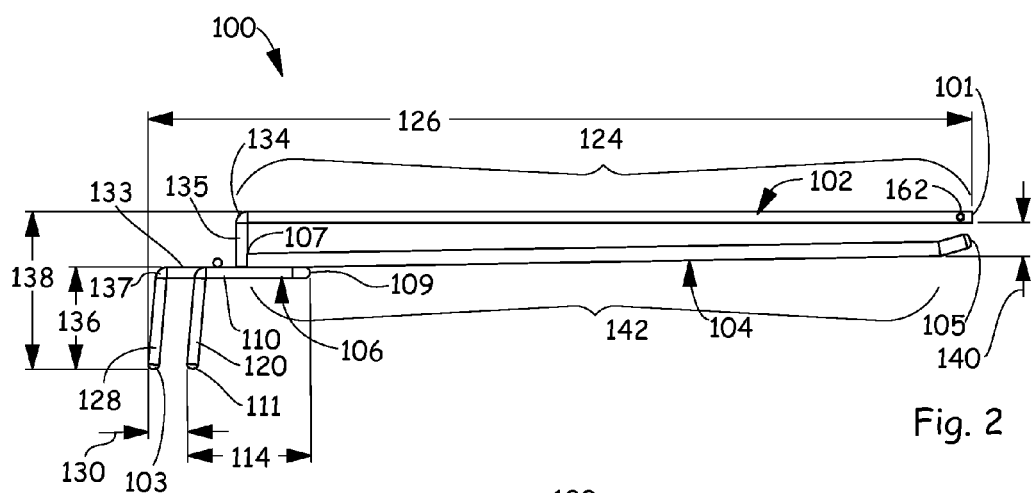
FIG. 2 is a side view of the display hook illustrated in FIG. 1.
Figure 3:
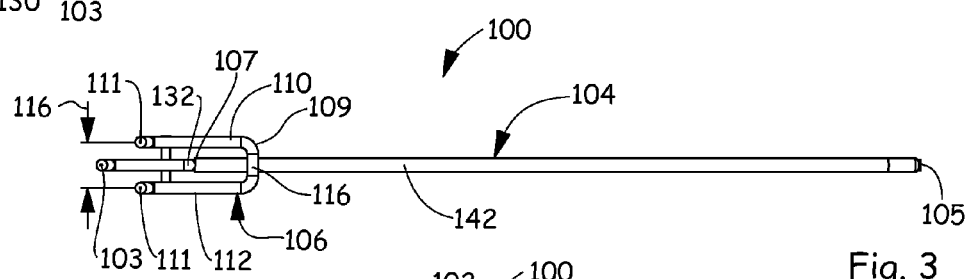
FIG. 3 is a bottom view of the display hook illustrated in FIG. 1.
Figure 4:
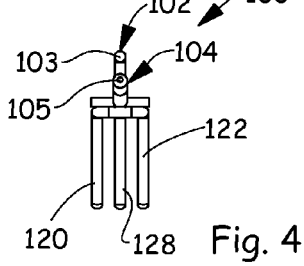
FIG. 4 is a front view of the display hook illustrated in FIG. 1.

FIG. 1 is a perspective view of a display hook or hanger 100 according to one embodiment. FIGS. 2-4 are a left side view, a bottom view and a front view, respectively, for the display hook or hanger 100 illustrated in FIG. 1. The right side view of display hook 100 is a mirror image of the left side view. Display hook 100 includes a first arm or upper stem or rod 102, a second arm or lower stem or rod 104 and a loop member 106. Loop member 106 is indirectly coupled to first arm 102 by a cross piece 108. In one embodiment, first arm 102, second arm 104 and loop member 106 are all made of a metal wire stock. However, it should be realized that other types of materials can be used including various types of extruded polymers.

First arm 102 includes a free end or distal end 101 and a mounting end or proximal end 103. Second arm 104 includes a free end or distal end 105 and a fixed end or proximal end 107. Loop member 106 includes a distal end 109 and mounting ends or proximal ends 111. Loop member 106 includes a pair of parallel stems or rods 110 and 112 that substantially define a length 114 of loop member 106 and are integrally connected at distal end 109. Parallel stems 110 and 112 are spaced apart from each other by a distance 116. Distance 116 can vary depending on a variety of different factors including, for example, the type of structure to which display hook 100 is attached. Specifically, loop member 106 includes a pair of prongs 120 and 122 for mounting display hook or hanger 100 to a display structure. Each prong 120 and 122 is integrally coupled to and oriented downwardly from one of the stems 110 and 112, respectively. Each prong 120 and 122 terminates at one of the proximal ends 111 of loop member 106 and is oriented in parallel with the other prong.

First arm or upper stem or rod 102 is partially located and extends between the pair of parallel stems 110 and 112 of loop member 106. First arm 102 includes a length 126 with a main portion 124 of first arm 102 extending along an axis 125. First arm 102 also includes a prong 128 that is integrally coupled to and oriented downwardly so as to mount display hook or hanger 100 to a display structure. Prong 128 terminates at mounting end 103 and is substantially oriented in parallel with prongs 120 and 122. As illustrated in FIG. 2, the mounting ends 111 of loop member 106 are located a distal distance 130 from mounting end 103 of first arm 102. Yet another way to describe the relative positions of prongs 120, 122 and 128 includes describing two of the downwardly depending prongs as being located in the same, single plane and the third downwardly depending prong being located outside of that single plane. For example, prongs 120 and 122 extend along the same, vertical plane, but prong 128 extends outside of that vertical plane. In another example, prongs 120 and 128 extend along the same, vertical plane, but prong 122 extends outside of that vertical plane. In yet another example, prongs 122 and 128 extend along the same, vertical plane, but prong 120 extends outside of that vertical plane.

First arm 102 further includes a first bend 132 and a second bend 134. As illustrated in FIGS. 1 and 2, a portion 133 of first arm 102 that extends between prong 128 and first bend 132 is not only in parallel with the pair of parallel stems 110 and 112, but also extends along a height 136 relative to mounting end 103 that is substantially the same as the height of the pair of parallel stems 110 and 112 relative to mounting ends 111. A portion 135 of first arm 102 that extends between first bend 132 and second bend 134 allows main portion 124, which extends between second bend 134 and distal end 101 and is substantially parallel with the pair of parallel stems 110 and 112, to be located at a height 138 relative to mounting end 103 that is greater than height 136 of the pair of parallel stems 110 and 112. In other words, main portion 124 of first arm 102 is spaced above the pair of parallel stems 110 and 112 by a distance 140. First arm 102 also includes a third bend 137. Downwardly extending prong 128 is defined between mounting end 103 and third bend 137.

Second arm or lower stem or rod 104 has distal end 105, proximal end 107 and a main portion 142 and is the arm that receives an item for display. Main portion 142 of first arm 102 is substantially parallel with and located below main portion 124 of first arm 102. Distal end 105 of second arm 104 is located directly below distal end 101 of first arm 102 and proximal end 107 of second arm is directly connected to first arm 102 between first bend 132 and second bend 134 of first arm 102. Distal end 105 of second arm 104 is angled upwards from main portion 142 of second arm 104 so as to pinch an item that is hung on second arm 104.

Figure 5:
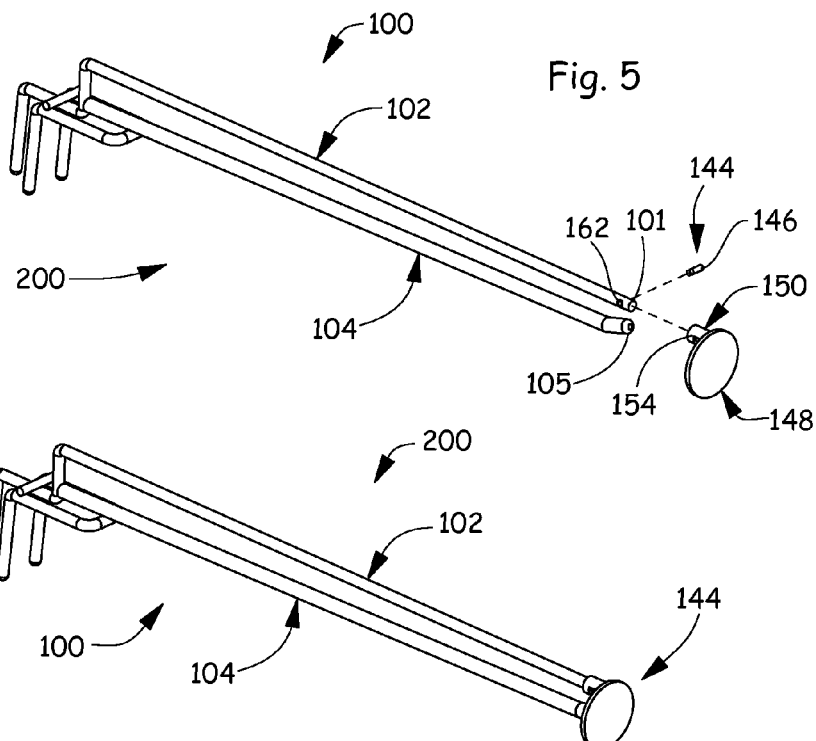
FIG. 5 is an exploded perspective view of a swatch holder including the display hook illustrated in FIG. 1 according to one embodiment.
Figure 6:
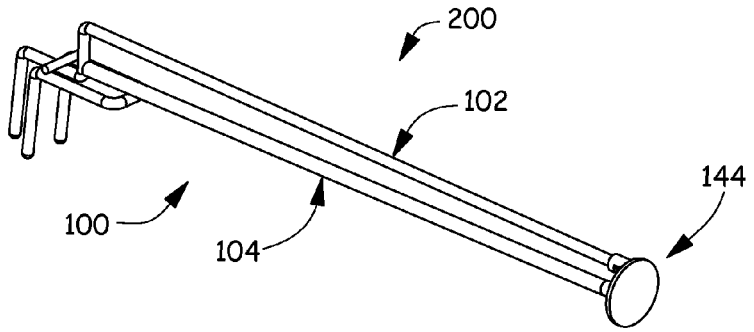
FIG. 6 is an assembled perspective view of FIG. 5.
Figure 7:
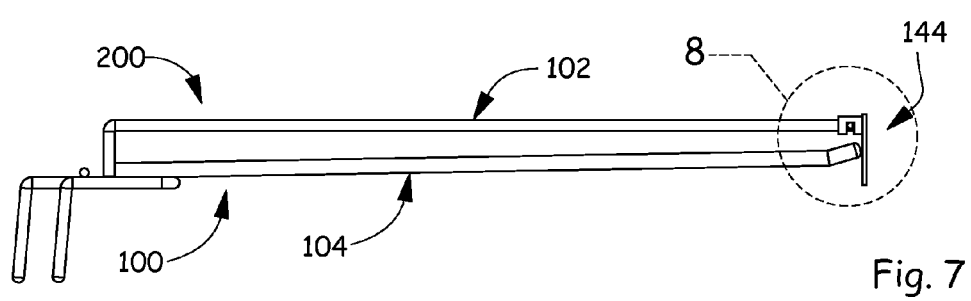
FIG. 7 is an assembled side view of FIG. 6.
Figure 8:
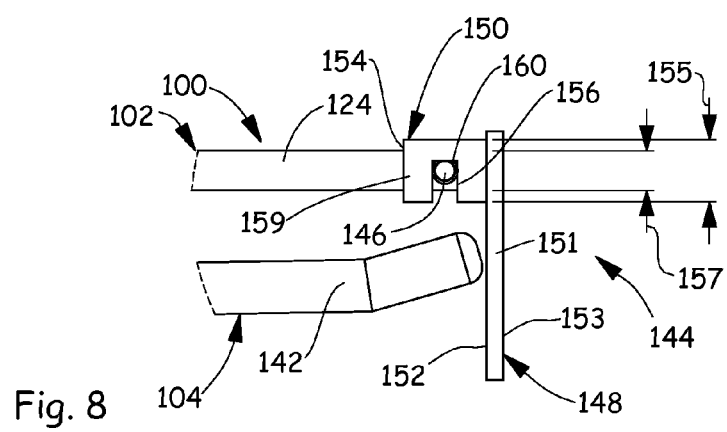
FIG. 8 is an enlarged view of a portion of FIG. 7.

FIG. 5 is an exploded perspective view of a swatch holder 200 according to one embodiment. FIG. 6 is an assembled perspective view of FIG. 5. FIGS. 7, 9 and 11 are a left side view, a top view and a front view, respectively, for the assembled swatch holder 200 illustrated in FIG. 6. FIG. 8 is an enlarged view of a portion of FIG. 7, FIG. 10 is an enlarged view of a portion of FIG. 9 and FIG. 12 is an enlarged view of a portion of FIG. 11. Swatch holder 200 includes display hook 100 and a front plate assembly 144. Front plate assembly 144 includes a stop pin 146, a swivel plate 148 and stem receiver or bored extension 150. Stop pin 146 includes an insertion end 143 and an exterior end 145 (see FIGS. 10 and 12). Swivel plate 148 is a circular disc having a diameter 149 (FIGS. 11 and 12), an outer circumferential edge 151, a back 152 and a front 153. Stem receiver or bored extension 150 is directly attached to back 152 of swivel plate 148 and includes an outer diameter 155 (FIG. 8) and an inner diameter 157 (FIG. 8). Stem receiver 150 extends from or protrudes from back 152 of swivel plate 148 and terminates at an end 154 (FIG. 8). Diameter 149 of swivel plate 148 is greater than outer diameter 155 of stem receiver 150 and stem receiver 150 is located adjacent to outer circumferential edge 151 of swivel plate 148. Stem receiver or bored extension 150 includes an interior bearing surface 161 (shown in phantom in FIGS. 10 and 12) defined by interior diameter 157, an outer surface 159 and a peripheral slot 156 (FIG. 8). As illustrated in FIGS. 5-12, peripheral slot 156 extends through a wall of stem receiver 150 from interior bearing surface 161 to an outer surface 159 and from a first end 158 (FIG. 10) to a second end 160 (FIG. 10). Peripheral slot 156 is located on a portion of stem receiver 150 that faces a center point of swivel plate 148 and extends for a circumferential distance around the outer circumference of stem receiver 150.

As illustrated, swivel plate 148 of front plate assembly 144 is mounted on distal or free end 101 of first arm 102 by inserting distal or free end 101 into stem receiver or bored extension 150 of front plate assembly 144. In other words, stem receiver or bored extension 150 receives distal or free end 101 of first arm so that distal or free end 101 engages with interior bearing surface 161 of stem receiver 150. Stop pin 146 is then inserted through peripheral slot 156 and through an aperture or hole 162 in distal end 101 of first arm 102 to secure swivel plate 148 and stem receiver 150 to first arm 102. Aperture or hole 162 extends entirely through first arm 102 in a direction that is transverse to axis 125. Stop pin 146 extends through peripheral slot 156 in stem receiver 150, but only partially through the entirety of stem receiver 150 as is illustrated by insertion end 143 of stop pin 146 shown in phantom lines in FIG. 10 and by exterior end 145 of stop pin 146 in FIG. 10. Specifically, insertion end 143 is inserted through slot 156 and through aperture 162, but does not protrude through slot 156 again while exterior end 146 remains protruding from both aperture 162 and slot 156. In this way, stop pin 146 secures swivel plate 148 to first arm 102, but also allows swivel plate 148 to be rotatable about axis 125 of first arm 102.

When front plate assembly 144 is mounted to first arm 102 and in a first position or resting position as is illustrated in FIGS. 6-12, swivel plate 148 extends from first arm 102 and below distal end 105 of main portion 142 of second arm 104. In other words, a portion of back 152 of swivel plate 148 is located adjacent to distal end 105 of second arm 104. When front assembly is in a first position or resting position as is illustrated in FIGS. 6-12, first end 158 of peripheral slot 156 in stem receiver 150 is located adjacent exterior end 145 of stop pin 146.

Figure 13:
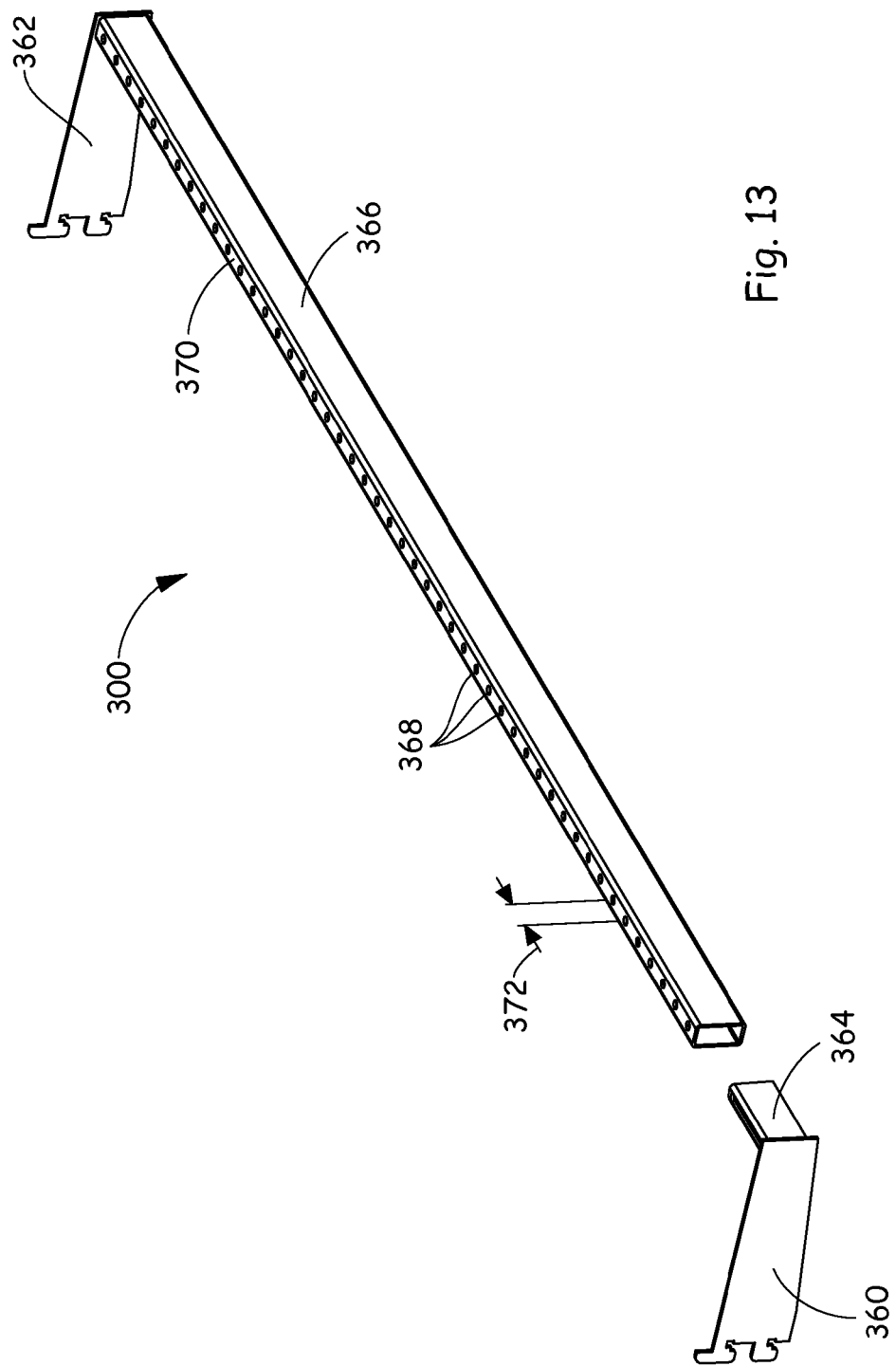
FIG. 13 is an exploded perspective view of a cross support according to one embodiment.
Figure 14:
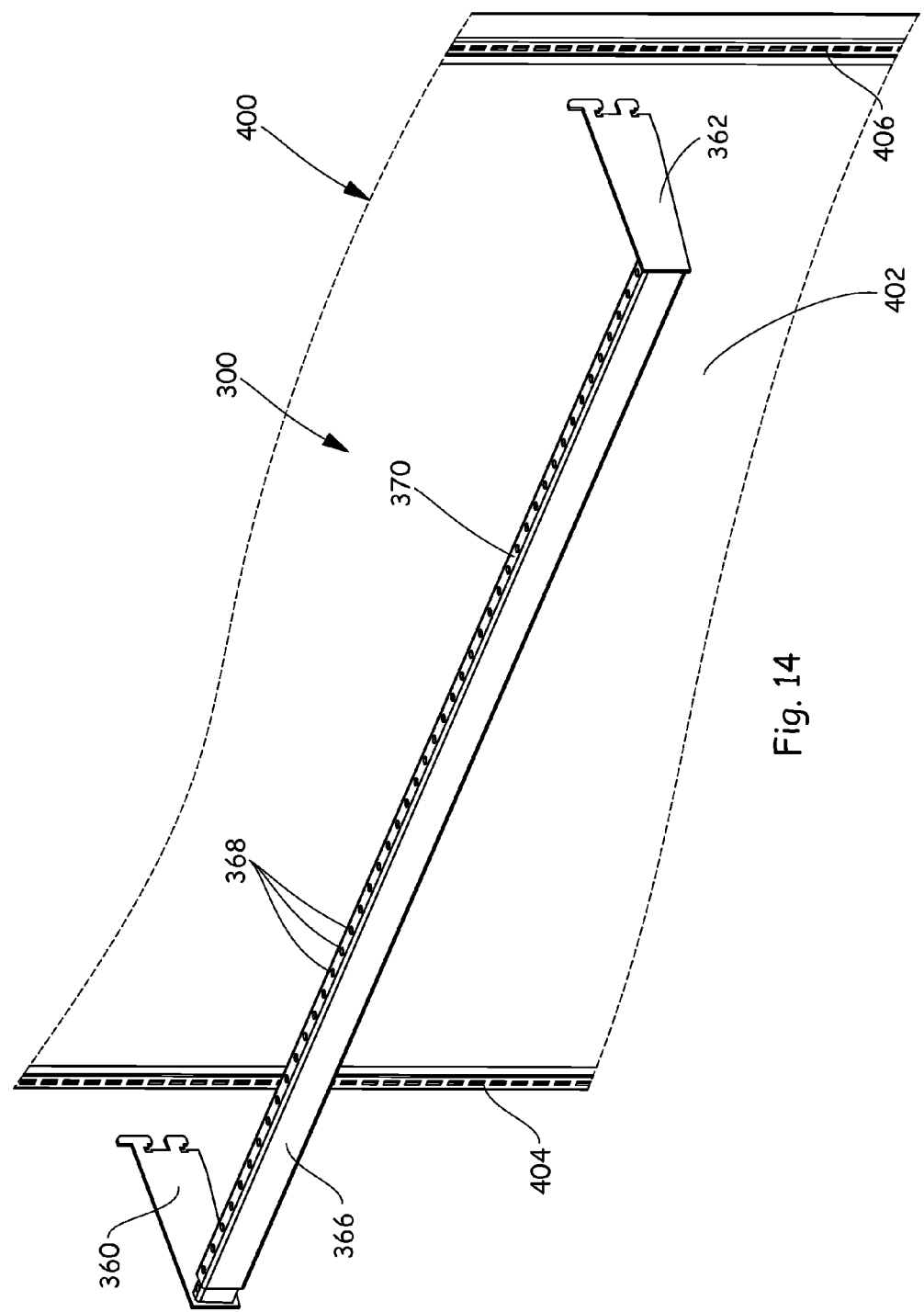
FIG. 14 illustrates the cross bar in FIG. 13 as assembled.

FIG. 13 is an exploded perspective view of a cross support 300 according to one embodiment and FIG. 14 illustrates assembled cross support 300 being mounted to a wall of a display structure. In one embodiment and as illustrated in FIG. 14, the display structure is a gondola 400. A gondola is a freestanding display fixture used to display products and merchandise. Gondola 400 includes a flat, substantially horizontal base or base deck (not illustrated) and a substantially vertical back wall 402 supported by a pair of slotted uprights 404 and 406. The substantially vertical back wall 402 can feature notches, a pegboard and/or a slat wall. In FIG. 14, the substantially vertical back wall 402 is a pegboard. Gondolas placed side-by-side form rows that define aisles in a retail store. In the embodiments described herein, cross support 300 can be mounted to the slotted uprights 404 and 406 of the substantially vertical back wall 402 of gondola 400.

Cross support 300 includes a pair of brackets 360 and 362 for mounting cross support 300 to a display structure, such as slotted uprights 404 and 406 of gondola 400. Cross support 300 also includes a telescopic arm 364 and a cross bar 366. Telescopic arm 364 is attached to bracket 360 and is configured to receive or slidably engage with cross bar 366, which is coupled to bracket 362. Telescopic arm 364 allows the distance between bracket 360 and bracket 362 or the length of cross support 300 to be adjusted depending upon the distance brackets 360 and 362 need to be apart from each other to be mounted to a display structure. For example, cross bar 366 is slidable over telescopic arm 364 to adjust the distance between bracket 360 and 362 for fitting on different width gondolas.

Cross bar 366 includes a plurality of holes 368 extending at least through a top 370 of cross bar 366. In one embodiment, each hole 368 can be evenly spaced apart from each other by a distance 372. For example, distance 372 is substantially similar to distance 116 (FIG. 3) that separates prong 120 from prong 122, substantially similar to a distance that separates prong 128 from prong 120 and substantially similar to a distance that separates prong 128 from prong 122.

Figure 15:
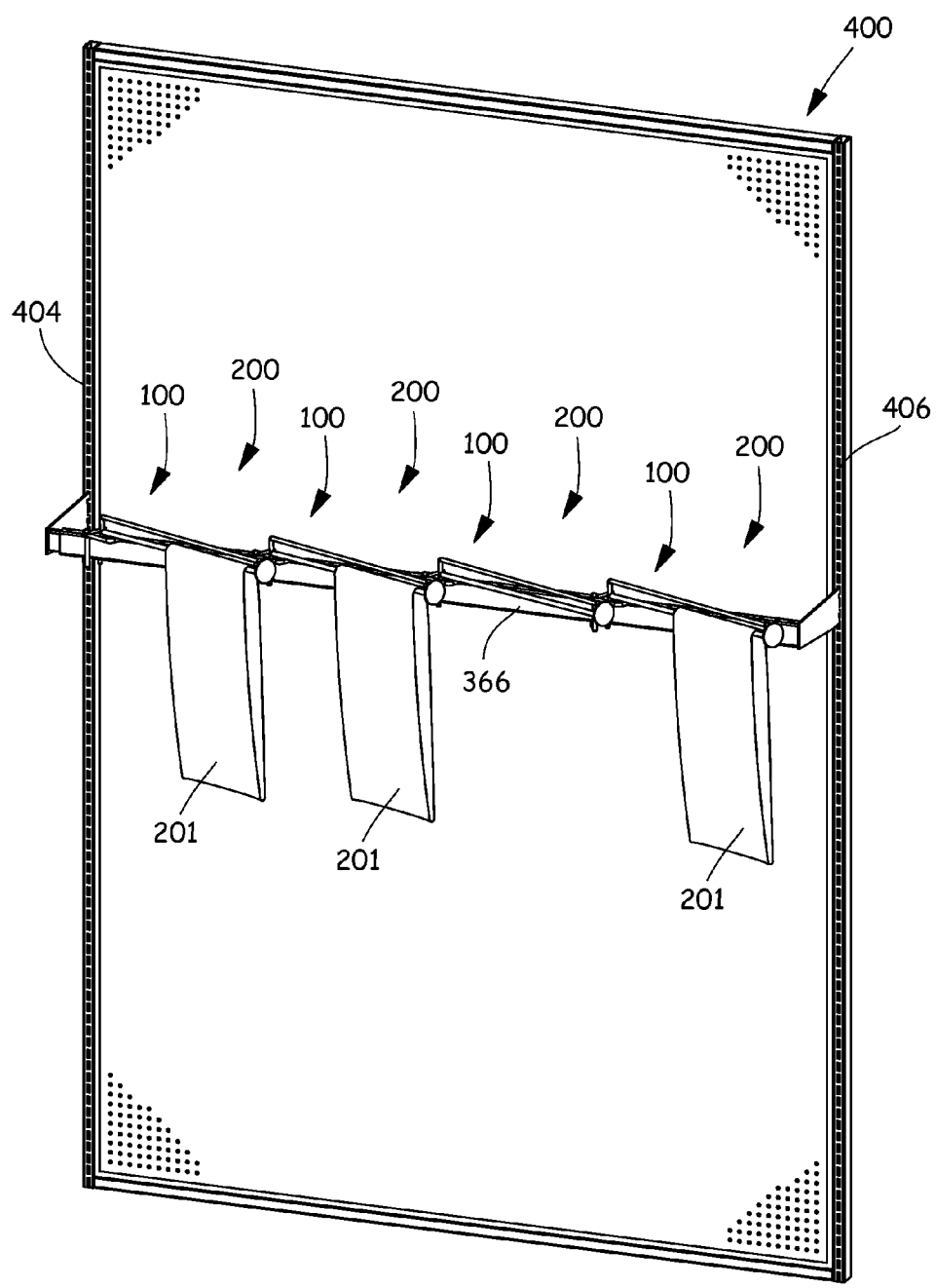
FIG. 15 illustrates a perspective view of a plurality of the swatch holders illustrated in FIG. 6 mounted to the cross bar illustrated in FIG. 14.

FIG. 15 illustrates a plurality of swatch holders 200 mounted to cross bar 366 in a first configuration or while display hooks 100 of swatch holders 200 are all oriented at an angle. As illustrated in FIG. 15, each swatch holder 200 supports an item 201 except for one of the swatch holders 200. The empty swatch holder 200 needs to be loaded with an item or swatch. As also illustrated in FIG. 15, two of the three downward depending mounting members 120, 122 and 128 of each display hook 100 are inserted into two adjacent holes 368 in cross bar 366. Specifically, mounting members 128 and 122 are inserted into two adjacent holes while mounting member 120 remains free. When mounting a plurality of swatch holders 200 on the same cross bar 366, all corresponding display hooks 100 should be mounted in the same configuration or oriented at the same angle so that each display hook 100 does not interfere with another of the display hooks 100 or so that the item that each swatch holder 200 is supporting does not interfere with items that are supported by other nearby swatch holders 200. In addition, each swatch holder 200 on cross bar 366 is spaced apart from the swatch holder 200 to which it is adjacent. The distance by which swatch holders 200 are spaced apart from each other or the number of holes that separate each display hook 100 of each swatch holder 200 depend on the size of the item hanging on swatch holder 200 or the number of items or swatches that need to be displayed on a given cross support.

Although not illustrated in FIG. 15, a display structure, such as display structure 400, can receive one or more cross supports 366 above and/or below the cross support 366 illustrated in FIG. 15. The cross supports 366 located above and/or below the cross support 366 illustrated in FIG. 15 can include a plurality of swatch holders 200 that are mounted in the same configuration or oriented at the same angle relative to cross bar 366 or can be mounted in a different configuration or oriented at a different angle relative to cross bar 366. For example, a cross support 366 located above the cross support 366 illustrated in FIG. 15 can include a plurality of swatch holders 200 oriented relative to the cross bar 366 at an angle which is different from the angle illustrated in FIG. 15. To accomplish this, each swatch holder 200 is mounted to cross bar 366 using two different downwardly depending mounting members than the downwardly depending mounting members used in FIG. 15. In another example, a cross support 366 located below the cross support 366 illustrated in FIG. 15 can include a plurality of swatch holders 200 oriented relative to the cross bar 366 at yet another angle, which is different from the other two angles. To accomplish this, each swatch holder 200 is mounted to cross bar 366 using two different downwardly depending mounting members than the downwardly depending mounting members discussed above.

Figure 16:
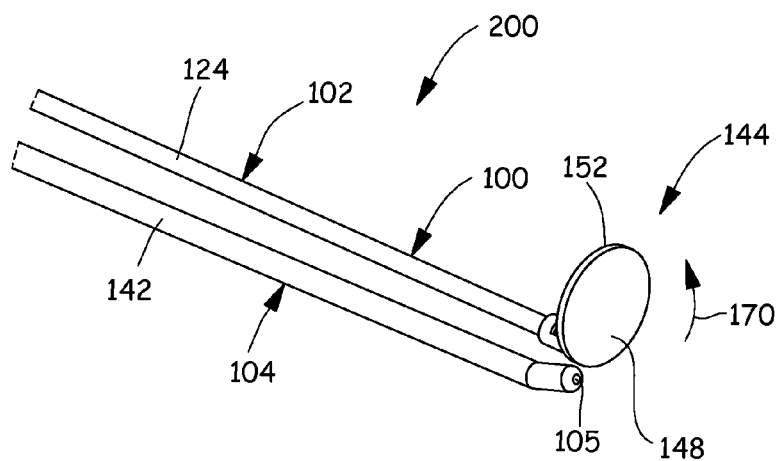
FIG. 16 is an enlarged view a portion of the swatch holder in FIG. 15 that is empty and in process of being loaded with a swatch.

FIG. 16 is an enlarged view a portion of swatch holder 200 in FIG. 15 that is empty and in need of being loaded with an item or swatch. As illustrated in FIG. 16, swivel plate 148 is rotated about axis 125 of first arm 102 in a counterclockwise direction 170 so that exterior end 145 of stop pin 146 is located adjacent to second end 160 of peripheral slot 156 and swivel plate 148 is moved from a first or resting position to a second or loading/unloading position. When rotating swivel plate 148, interior bearing surface 161 of stem receiver 150 slides around distal end 101 of first arm 102 until exterior end 145 of stop pin 146 contacts second end 160 of peripheral slot 156 to stop the rotation. As illustrated in FIG. 16, swivel plate 148 is rotated for approximately 180 degrees, which is the point where exterior end 145 of stop pin 148 engages with second end 160 of slot 156. However, swivel plate 148 can be rotated less than 180 degrees, such as approximately 120 degrees just as long as swivel plate 148 is away from distal end 105 far enough to load main portion 142 of second arm 104 with an item for display.

Figure 17:
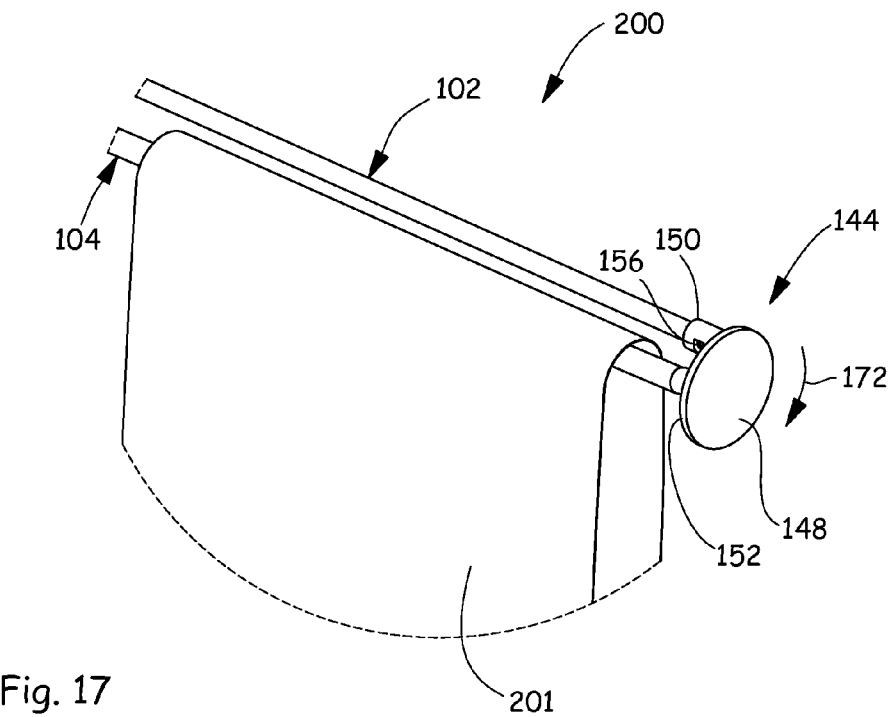
FIG. 17 is an enlarged view of the portion of the swatch holder in FIG. 16 loaded with a swatch and the swatch secured.
Figure 18:
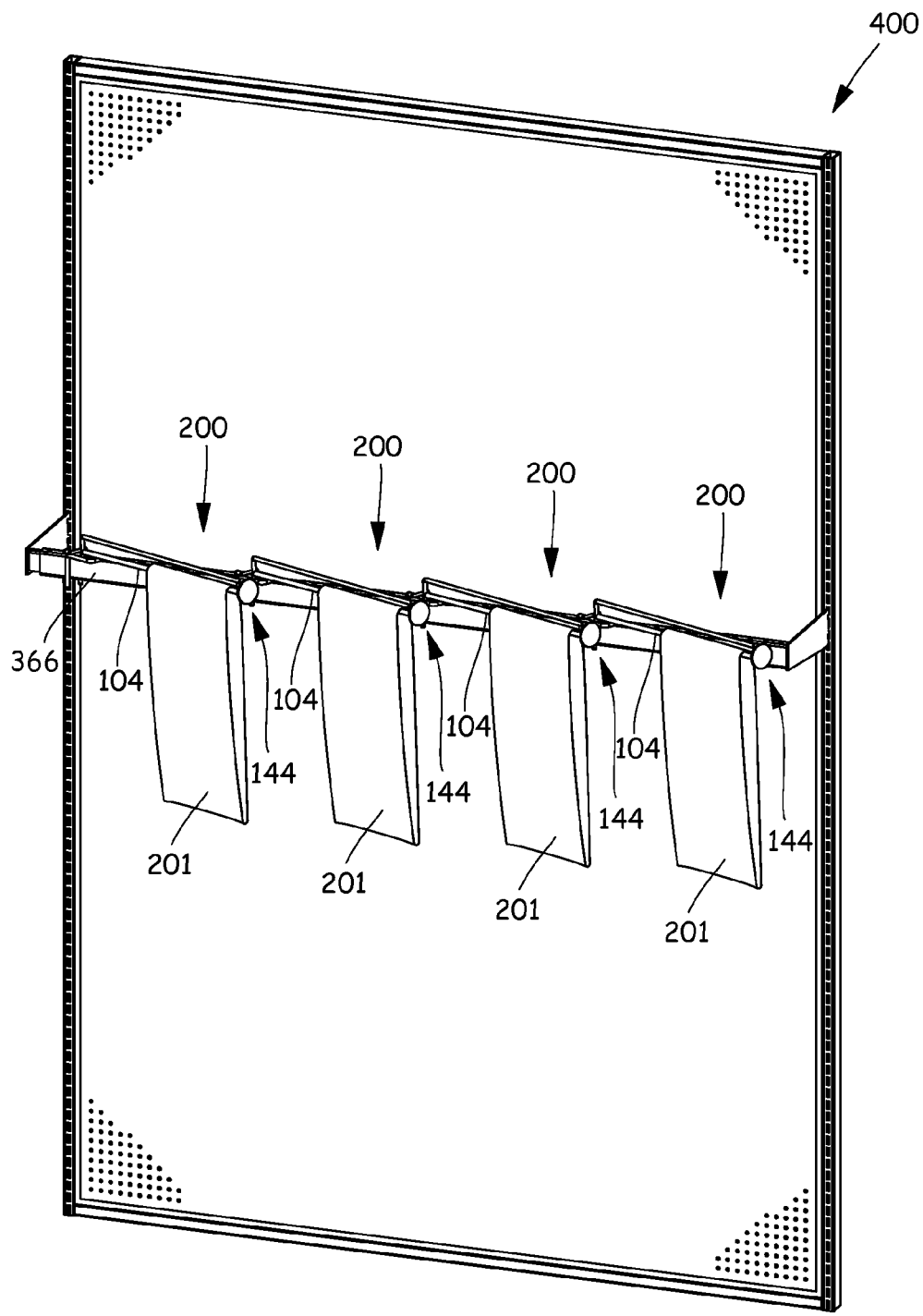
FIG. 18 illustrates a perspective of a plurality of swatch holders illustrated in FIG. 15 and with all swatch holders loaded with swatches and the swatches secured.

In one embodiment, the load/unload position illustrated in FIG. 16 must be held in this position by a user while an item or swatch 201 is being loaded because front plate assembly 144 is biased to the resting position. In other words, after an item or swatch 201 is loaded onto second arm 104, a user releases front plate assembly 144 from the load/unload position and swivel plate 148 will rotate in a clockwise direction 172 automatically back to its resting position as illustrated in FIG. 16. FIG. 17 illustrates a perspective of a plurality of swatch holders 200 with all swatch holders 200 loaded with items or swatches 201 and those items or swatches 201 being secured on second arm 104 by front plate assembly 144.

More specifically, a method of loading item 201 on swatch holder 200 is illustrated in FIGS. 15 and 16. A swivel plate 148 is mounted to distal end 101 of upper rod 102 with bored extension 150 that protrudes from back 152 of swivel plate 148 so that swivel plate 148 rotates from a resting position where back 152 is located adjacent to distal end 105 of lower rod 104 to a load/unload position (FIG. 15) where back 152 is rotated away from distal end 105 of lower rod 104. Item 201 is loaded onto lower rod 104 and swivel plate 148 is released so that swivel plate 148 returns automatically to the resting position (FIG. 16) where back 152 of swivel plate 148 is adjacent to distal end 105 of lower rod 104 so that item 201 cannot be easily taken off lower rod 104.

As illustrated in FIG. 15, when rotating swivel plate 148, slot 156 in bored extension 150 moves relative to stop pin 146 that is located through the slot, but only partially through an entirety of bored extension 150. As illustrated in FIG. 16, when item 201 is loaded onto lower rod 104, item 201 is slid past a distal end 105 of lower rod that is angled upward relative to main portion 142 of lower rod 104 that is substantially parallel with main portion 124 of upper rod 102.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A swatch holder comprising:
an upper rod having a distal end and at least partially extending along an axis;
a lower rod having a distal end;
a swivel plate having a bored extension protruding substantially perpendicular from a back of the swivel plate and being mounted to the upper rod so that an interior bearing surface of the bored extension engages the distal end of the upper rod, wherein the bored extension and the swivel plate radially rotate about the axis of the upper rod from a first position where the back of the swivel plate is located adjacent to the distal end of the lower rod to a second position where the back of the swivel plate is rotated away from the distal end of the lower rod to load or unload at least one swatch, wherein the swivel plate returns to the first position upon releasing the swivel plate from the second position so that the at least one swatch is unable to be easily removed from the lower rod; and
a stop in that is inserted at least partially through an aperture extending through the upper rod substantially perpendicular to the axis of the upper rod and through a slot in the bored extension so that the slot in the bored extension moves relative to the stop pin when the bored extension and the swivel plate radially rotate about the axis of the upper rod.

2. The swatch holder of claim 1, wherein the at least one swatch is loaded on the lower rod past a portion of the lower rod that is angled upward relative to another portion of the lower rod that is substantially parallel with a portion of the upper rod.

3. The swatch holder of claim 1, wherein the slot in the bored extension comprises a first end and a second end, wherein when the swivel plate is in the first position an exterior end of the stop pin is located adjacent the first end of the slot and when the swivel plate is in the second position the exterior end of the stop pin is located adjacent the second end of the slot.

4. A swatch holder comprising:
a display hook including an upper stem having a main portion that extends along an axis to a free end and a lower stem having a free end, the upper stem including an aperture spaced apart from the free end that extends through the upper stem and is substantially perpendicular to the axis;
a swivel plate including a bored extension that protrudes substantially perpendicular from a back of the swivel plate, the bored extension having an outer wall and an interior bearing surface;
a stop pin including an insertion end and an exterior end;
wherein the swivel plate is mounted to the upper stem by inserting the free end of the upper stem into the interior bearing surface of the bored extension such that a center of the bored extension aligns with the axis of the main portion of the upper stem;
wherein the stop pin is inserted through a slot in the bored extension and at least partially through the aperture in the upper stem; and
wherein the swivel plate is rotatable about the upper stem so that when the swivel plate is in a first position an exterior end of the stop pin is located adjacent a first end of the slot in the bored extension and when the swivel plate is in a second position the exterior end of the stop pin is located adjacent a second end of the slot in the bored extension.

5. The swatch holder of claim 4, wherein the slot in the bored extension is positioned such that it faces a center of the swivel plate.

6. The swatch holder of claim 4, wherein the slot extends from the first end to the second end by a circumferential distance that allows the swivel plate to rotate.

7. The swatch holder of claim 4, wherein the swivel plate comprises a circular disc.

8. The swatch holder of claim 4, wherein the free end of the lower stem is angled upwards from a portion of the lower stem that is parallel with a portion of the upper stem so as to pinch an item that is hung on the lower stem.

9. The swatch holder of claim 4, wherein the upper stem comprises at least a first bend and a second bend and a fixed end of the lower stem is connected to the upper stem between the first and second bends.

10. The swatch holder of claim 9, wherein the upper stem further comprises a third bend and between the third bend and a mounting end of the upper stem is a downwardly extending prong for mounting the display hook to a display structure.

11. The swatch holder of claim 10, wherein the display hook further comprises a loop member having a pair of parallel stems that are integrally connected at a free end of the loop member and a pair of parallel prongs, wherein each of the pair of parallel prongs are integrally coupled to one of the pair of parallel stems and are oriented downwardly from each of the pair of parallel stems for mounting the display hook to the display structure.

12. The swatch holder of claim 11, wherein two prongs are selected from the downwardly extending prong of the upper stem and from the pair of parallel prongs of the loop member to be used to mount the display hook to the display structure.

13. A swatch holder comprising:
a display hanger including a first arm that extends at least partially along an axis and includes a distal end and a proximal end and a second arm that includes a distal end and a proximal end, wherein at least a portion of the second arm is located below at least a portion of the first arm; and
a front plate assembly coupled to the distal end of the first arm and including a stop pin, a swivel plate and a stem receiver attached to a back of the swivel plate, the stem receiver extending substantially perpendicular from a back of the swivel plate and terminating at an end and having an interior bearing surface and a peripheral slot;

wherein the distal end of the first arm is inserted into the stem receiver such that a center of the stem receiver aligns with the axis of the first arm;

wherein the stop pin is inserted through the peripheral slot in the stem receiver and at least partially through a hole the first arm that extends through the first arm a spaced distance from the distal end in a direction that is transverse to the axis of the first arm; and wherein the front plate assembly is located in a resting position when a portion of the back of the swivel plate is located adjacent to the distal end of the second arm and the front plate assembly is located in a load/unload position when the swivel plate is rotated about the distal end of the first arm using the interior bearing surface of the stem receiver such that an item is loaded or unloaded from the second arm.

14. The swatch holder of claim 13, wherein the swivel plate is rotated to move the front plate assembly from the resting position to the load/unload position.

15. The swatch holder of claim 13, wherein the swivel plate comprises a circular disc having a diameter that is greater than a diameter of the stem receiver.

16. The swatch holder of claim 13, wherein the stem receiver is located adjacent to a circumferential edge of the swivel plate.

17. The swatch holder of claim 13, wherein the distal end of the second arm is angled upwards from a portion of the second arm that is parallel with a portion of the first arm so as to pinch the item that is hung on the second arm.

18. The swatch holder of claim 13, wherein the first arm comprises at least a first bend and a second bend and the proximal end of the second arm is connected to the first arm between the first and second bends.

* * * * *